(12) United States Patent
Uehara et al.

(10) Patent No.: US 10,174,844 B2
(45) Date of Patent: Jan. 8, 2019

(54) SHAFT SEAL MECHANISM

(71) Applicant: MITSUBISHI HITACHI POWER SYSTEMS, LTD., Kanagawa (JP)

(72) Inventors: Hidekazu Uehara, Tokyo (JP); Kohei Ozaki, Tokyo (JP); Azumi Yoshida, Tokyo (JP); Hiroharu Oyama, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/535,591

(22) PCT Filed: Dec. 15, 2015

(86) PCT No.: PCT/JP2015/085003
§ 371 (c)(1),
(2) Date: Jun. 13, 2017

(87) PCT Pub. No.: WO2016/098755
PCT Pub. Date: Jun. 23, 2016

(65) Prior Publication Data
US 2017/0350510 A1 Dec. 7, 2017

(30) Foreign Application Priority Data
Dec. 16, 2014 (JP) .................................. 2014-253686

(51) Int. Cl.
*F16J 15/44* (2006.01)
*F16J 15/3276* (2016.01)
(Continued)

(52) U.S. Cl.
CPC .......... *F16J 15/3276* (2013.01); *F01D 11/00* (2013.01); *F02C 7/28* (2013.01); *F16J 15/22* (2013.01);
(Continued)

(58) Field of Classification Search
CPC .... F16J 15/3276; F16J 15/3292; F16J 15/442; F05D 2300/501; F05D 2240/58
See application file for complete search history.

(56) References Cited

U.S. PATENT DOCUMENTS 8,794,633 B2 8/2014 Williams
9,057,444 B2 6/2015 Jahn
(Continued)

FOREIGN PATENT DOCUMENTS

EP  2 604 894  6/2013
EP  2 669 555  12/2013
(Continued)

OTHER PUBLICATIONS

International Search Report dated Feb. 16, 2016 in International Application No. PCT/JP2015/085003.
(Continued)

*Primary Examiner* — Gilbert Y Lee
(74) *Attorney, Agent, or Firm* — Wenderoth, Lind & Ponack, L.L.P.

(57) ABSTRACT

A shaft seal mechanism (11) that blocks a fluid (G) flowing within a ring-shaped space (14) is equipped with: a ring-shaped seal housing (21) disposed on a fixed section (12); a plurality of thin-plate seal pieces (22) that are secured to the seal housing (21), are in sliding contact with a rotating shaft (13), and are layered in a ring shape; a ring-shaped high-pressure-side plate (25) that forms a high-pressure-side gap ($\delta H$) between itself and the seal housing (21); a ring-shaped low-pressure-side plate (26) that forms a low-pressure-side gap ($\delta L$) between the seal housing (21) and the thin-plate seal pieces (22); stepped sections (31, 32) that are formed on side edge sections (22c, 22d) of the thin-plate seal pieces (22); and locking sections (25b, 26b) that lock the stepped sections (31, 32).

4 Claims, 6 Drawing Sheets

(51) Int. Cl.
*F01D 11/00* (2006.01)
*F02C 7/28* (2006.01)
*F16J 15/22* (2006.01)
*F16J 15/447* (2006.01)
*F16J 15/3292* (2016.01)

(52) U.S. Cl.
CPC ......... *F16J 15/3292* (2013.01); *F16J 15/442* (2013.01); *F16J 15/447* (2013.01); *F05D 2240/58* (2013.01); *F05D 2300/501* (2013.01)

(56) References Cited

U.S. PATENT DOCUMENTS

| | | | |
|---|---|---|---|
| 9,593,588 B2* | 3/2017 | Morimoto | F01D 11/02 |
| 9,677,410 B2 | 6/2017 | Shinohara et al. | |
| 9,677,669 B2* | 6/2017 | Uehara | F16J 15/3292 |
| 2008/0048399 A1* | 2/2008 | Nicholson | F01D 11/001 |
| | | | 277/355 |
| 2009/0309311 A1 | 12/2009 | Verma et al. | |
| 2013/0154199 A1 | 6/2013 | Williams | |
| 2013/0181412 A1 | 7/2013 | Shinohara et al. | |

FOREIGN PATENT DOCUMENTS

| | | |
|---|---|---|
| FR | 2 650 048 | 1/1991 |
| FR | 2 915 548 | 10/2008 |
| JP | 2008-275157 | 11/2008 |
| JP | 2013-145007 | 7/2013 |
| KR | 10-2014-0052916 | 5/2014 |
| WO | 2013/105606 | 7/2013 |

OTHER PUBLICATIONS

International Preliminary Report on Patentability dated Jun. 20, 2017 in International Application No. PCT/JP2015/085003.
Extended European Search Report dated Nov. 30, 2017 in corresponding European patent application No. 15869960.3.

* cited by examiner ized seal pieces. The sizes of the low-pressure-side gap and the high-pressure-side gap is highly important to lift up the thin-plate seal pieces.

SHAFT SEAL MECHANISM

TECHNICAL FIELD

The present invention relates to a shaft seal mechanism that is disposed in the vicinity of a rotating shaft of a steam turbine or a gas turbine and reduces a leakage of a fluid from a high pressure side to a low pressure side.

BACKGROUND ART

Conventionally, a shaft seal mechanism for reducing a leakage of a fluid from a high pressure side to a low pressure side is disposed in the vicinity of a rotating shaft of a steam turbine or a gas turbine, in order to suppress a loss of driving force. Such a shaft seal mechanism has a ring-shaped seal structure in which thin-plate seal pieces having flat plate shapes with their width dimensions being in the rotating shaft direction are arranged into multiple layers in the circumferential direction of the rotating shaft. Outer-circumferential-side proximal end sections of the thin-plate seal pieces are fixed to a ring-shaped seal housing; on the other hand, inner-circumferential-side distal end sections of the thin-plate seal pieces are in sliding contact with the outer circumferential surface of the rotating shaft at a predetermined preload. In the shaft seal mechanism having this configuration, the surrounding space of the rotating shaft can be divided into a high-pressure-side region and a low-pressure-side region with the boundary formed by a large number of the thin-plate seal pieces arranged into a ring shape outward in the radial direction of the rotating shaft.

While the rotation of the rotating shaft is stopping, the inner-circumferential-side distal end sections of the thin-plate seal pieces are into contact with the outer circumferential surface of the rotating shaft at the predetermined preload. On the other hand, while the rotating shaft is rotating, the thin-plate seal pieces are bent by pressure difference due to relative positional shift in pressure distribution between the top and bottom surfaces of the thin-plate seal pieces and by dynamic pressure effect of the fluid generated by the rotation of the rotating shaft, and accordingly, the inner-circumferential-side distal end sections of the thin-plate seal pieces are lifted up from the outer circumferential surface of the rotating shaft into a noncontact state. This configuration prevents abrasion of and heat generation in the thin-plate seal pieces and the rotating shaft. The bottom surfaces of the thin-plate seal pieces refer to surfaces facing the rotating shaft, and the top surfaces thereof refer to surfaces opposite to the bottom surfaces.

Such a conventional shaft seal mechanism is disclosed, for example, in Patent Document 1 listed below.

CITATION LIST

Patent Document

Patent Document 1: US Unexamined Patent Application Publication No. 2013/0154199A

SUMMARY OF INVENTION

Technical Problem

In this shaft seal mechanism, gaps of predetermined sizes are provided on both low pressure and high pressure sides of the thin-plate seal pieces. The sizes of the low-pressure-side gap and the high-pressure-side gap are adjusted to generate the pressure difference in the thin-plate seal pieces and thus to provide lifting-up force to the thin-plate seal pieces. That is, control of the sizes of the low-pressure-side gap and the high-pressure-side gap is highly important to lift up the thin-plate seal pieces.

Unfortunately, the gap sizes are minute and defined by the thin-plate seal pieces and multiple support members disposed in the vicinity thereof. As a result, even if the gap sizes are preset correctly, a machining error, an assembling error, or the like of the thin-plate seal pieces and the support members may cause the actual gap sizes in assembly not to be appropriate to provide stable lifting-up force, in some cases.

At this time, the actual gap sizes smaller than appropriate gap sizes disturb the pressure distribution and pressure difference and may thus apply pressing force in a direction opposite to the applying direction of the lifting-up force to the thin-plate seal pieces in some cases. If the pressing force pressing the inner-circumferential-side distal end sections is applied to the thin-plate seal pieces, the inner-circumferential-side distal end sections come into contact with the rotating shaft and may have abrasion.

To solve the above problem, an object of the present invention is to provide a shaft seal mechanism that, even if pressing force is applied to thin-plate seal pieces, can suppress deformation due to the pressing force and prevent abrasion due to contact with a rotating shaft in the thin-plate seal pieces.

Solution to Problem

A shaft seal mechanism according to a first invention that solves the above problem, is disposed in a ring-shaped space defined between a fixed section and a rotating shaft to divide the ring-shaped space into a high-pressure-side region and a low-pressure-side region and to block a fluid flowing from the high-pressure-side region to the low-pressure-side region in a rotating shaft direction within the ring-shaped space, the shaft seal mechanism including: a ring-shaped seal housing being disposed on an inner circumferential section of the fixed section; multiple thin-plate seal pieces including outer-circumferential-side proximal end sections fixed to the seal housing and inner-circumferential-side distal end sections being free ends forming acute angles with an outer circumferential surface of the rotating shaft, the thin-plate seal pieces having width dimensions in the rotating shaft direction, and the thin-plate seal pieces being layered in a ring shape in a circumferential direction of the rotating shaft; a ring-shaped high-pressure-side plate being disposed adjacent to high-pressure-side side edge sections, facing the high-pressure-side region, of the thin-plate seal pieces so that a high-pressure-side gap is defined between the high-pressure-side plate and the seal housing in the rotating shaft direction; a ring-shaped low-pressure-side plate being held between low-pressure-side side edge sections, facing the low-pressure-side region, of the thin-plate seal pieces and the seal housing so that a low-pressure-side gap is defined between the low-pressure-side side edge sections and the seal housing in the rotating shaft direction; high-pressure-side stepped sections being formed on the high-pressure-side side edge sections; low-pressure-side stepped sections being formed on the low-pressure-side side edge sections; a high-pressure-side locking section being formed on the high-pressure-side plate and locking the high-pressure-side stepped sections from an inside in a radial direction of the rotating shaft; and a low-pressure-side locking section being formed on the low-pressure-side plate and locking the low-pressure-side stepped sections from the inside in the radial direction of the rotating shaft.

In a shaft seal mechanism according to a second invention that solves the above problem, the high-pressure-side stepped sections each include an inclined end surface engaged with an inclined surface of the high-pressure-side locking section in the radial direction of the rotating shaft; and the low-pressure-side stepped sections each include an inclined end surface engaged with an inclined surface of the low-pressure-side locking section in the radial direction of the rotating shaft.

A shaft seal mechanism according to a third invention that solves the above problem, is disposed in a ring-shaped space defined between a fixed section and a rotating shaft to divide the ring-shaped space into a high-pressure-side region and a low-pressure-side region and to block a fluid flowing from the high-pressure-side region to the low-pressure-side region in a rotating shaft direction within the ring-shaped space, the shaft seal mechanism including: a ring-shaped seal housing being disposed on an inner circumferential section of the fixed section; multiple thin-plate seal pieces including outer-circumferential-side proximal end sections fixed to the seal housing and inner-circumferential-side distal end sections being free ends forming acute angles with an outer circumferential surface of the rotating shaft, the thin-plate seal pieces having width dimensions in the rotating shaft direction, and the thin-plate seal pieces being layered in a ring shape in a circumferential direction of the rotating shaft so that a low-pressure-side gap is defined between low-pressure-side side edge sections facing the low-pressure-side region and the seal housing in the rotating shaft direction; low-pressure-side stepped sections being formed on the low-pressure-side side edge sections; and a low-pressure-side locking section being formed on the seal housing and locking the low-pressure-side stepped sections from the inside in a radial direction of the rotating shaft.

In a shaft seal mechanism according to a fourth invention that solves the above problem, the shaft seal mechanism further includes a ring-shaped low-pressure-side plate being held between the low-pressure-side side edge sections and the seal housing so that the low-pressure-side gap is defined between the low-pressure-side side edge sections and the seal housing; and the low-pressure-side locking section locks the low-pressure-side stepped sections inward in the radial direction of the rotating shaft with respect to an inner-circumferential-side distal end section of the low-pressure-side plate.

In a shaft seal mechanism according to fifth invention that solves the above problem, the low-pressure-side stepped sections each include an inclined end surface engaged with an inclined surface of the low-pressure-side locking section in the radial direction of the rotating shaft.

Advantageous Effects of Invention

The shaft seal mechanism according to the present invention locks the thin-plate seal pieces from the inside in the radial direction of the rotating shaft and accordingly, even if pressing force is applied to the thin-plate seal pieces, can suppress deformation due to the pressing force and prevent abrasion due to contact with the rotating shaft in the thin-plate seal pieces.

DESCRIPTION OF EMBODIMENTS

A shaft seal mechanism according to the present invention will be described in detail with reference to the drawings.

EXAMPLES

Figure 1:
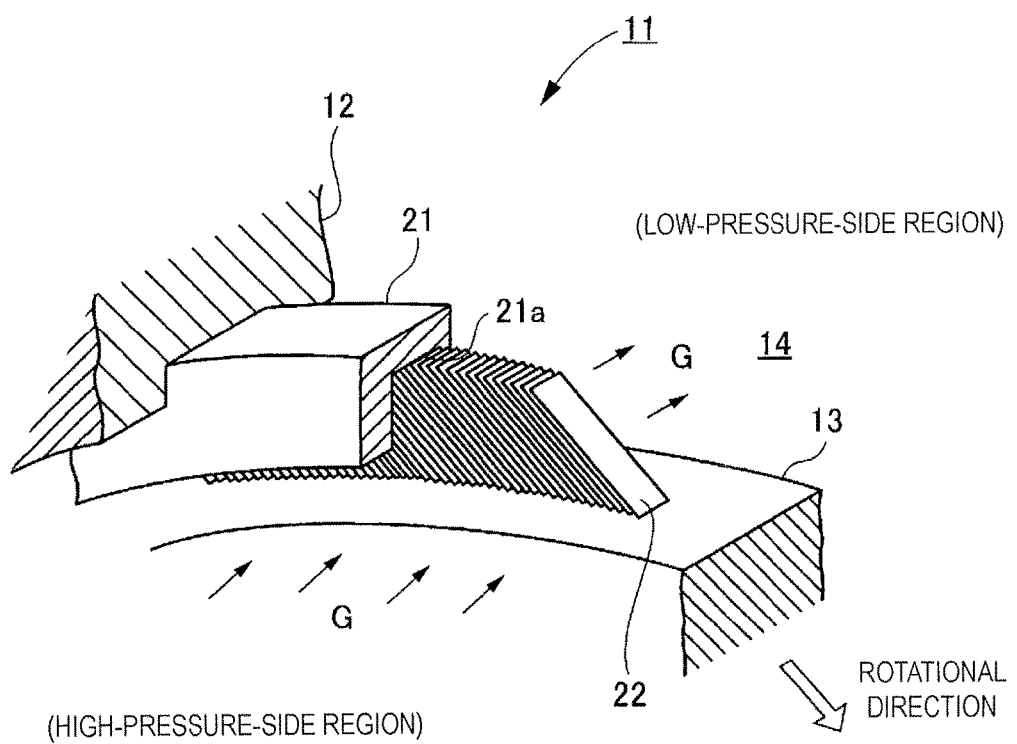
FIG. 1 is a schematic configuration diagram of a shaft seal mechanism according to the present invention.

With reference to FIG. 1, a shaft seal mechanism 11 according to the present invention is applied to, for example, a steam turbine or a gas turbine and is disposed in a ring-shaped space 14 defined between a fixed section (stationary section) 12 and a rotating shaft 13 of a casing, a vane, or the like.

Figure 2:
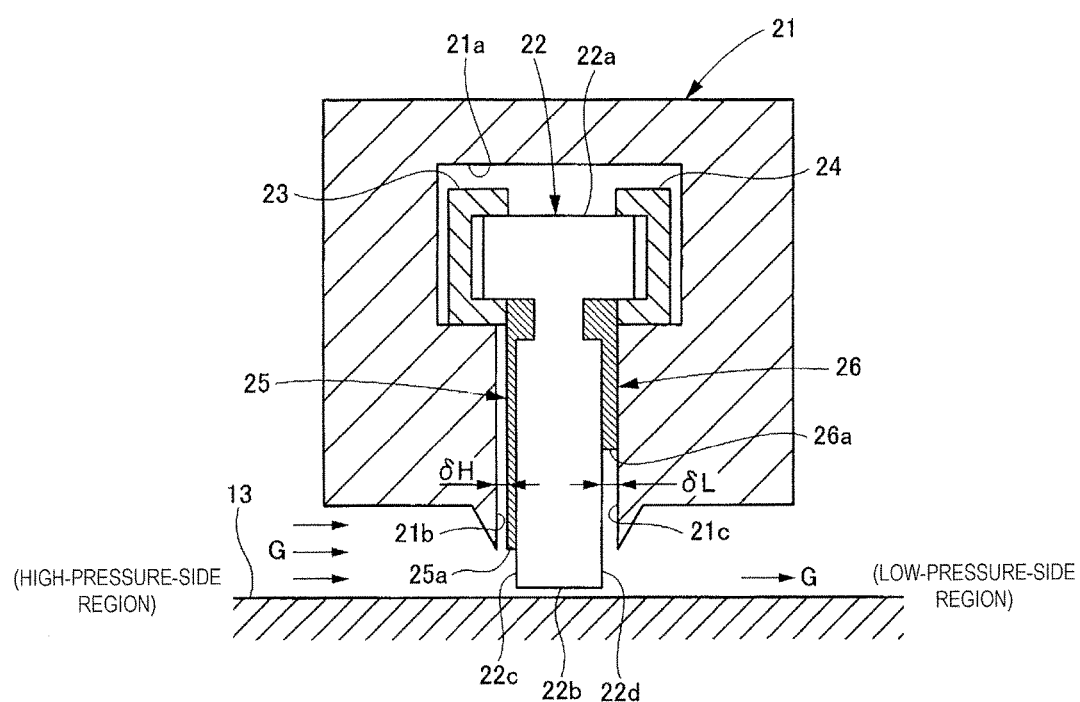
FIG. 2 is an axial cross-sectional view of the shaft seal mechanism according to the present invention.

Specifically, with reference to FIGS. 1 and 2, a seal housing 21 being an outer shell of the shaft seal mechanism 11 is disposed on an inner circumferential section of the fixed section 12 in the circumferential direction of the rotating shaft 13 and has a ring shape. A ring-shaped groove 21a is formed in an inner circumferential section of the seal housing 21. In the ring-shaped groove 21a, a large number of thin-plate seal pieces 22 are arranged in the circumferential direction of the rotating shaft 13.

Outer-circumferential-side proximal end sections 22a of the thin-plate seal pieces 22 are fixed to the ring-shaped groove 21a; on the other hand, inner-circumferential-side distal end sections 22b of the thin-plate seal pieces 22 are in sliding contact with the outer circumferential surface of the rotating shaft 13 at a predetermined preload. Here, the thin-plate seal pieces 22 are arranged in such a manner that the inner-circumferential-side distal end sections 22b being free ends are inclined in the rotational direction with respect to the outer circumferential surface of the rotating shaft 13 and form acute angles with the outer circumferential surface. Bottom surfaces of the thin-plate seal pieces 22 supported in an inclined manner refer to surfaces facing the rotating shaft 13, and top surfaces thereof refer to surfaces opposite to the bottom surfaces.

A fluid G, such as steam and combustion gas, flows from a high pressure side to a low pressure side in the axial direction of the rotating time 13 in the ring-shaped space 14 defined between the fixed section 12 and the rotating shaft 13. In response to this, the shaft seal mechanism 11 has a ring-shaped seal structure in which the thin-plate seal pieces 22 are arranged into multiple layers in the circumferential direction of the rotating shaft 13. The ring-shaped space 14 is divided into a high-pressure-side region being an upstream side in the fluid flowing direction and a low-pressure-side region being an downstream side in the fluid flowing direction with the boundary formed by a large number of the thin-plate seal pieces 22 arranged into a ring shape. This configuration reduces a leakage of the fluid G from the high-pressure-side region to the low-pressure-side region.

Figure 3:
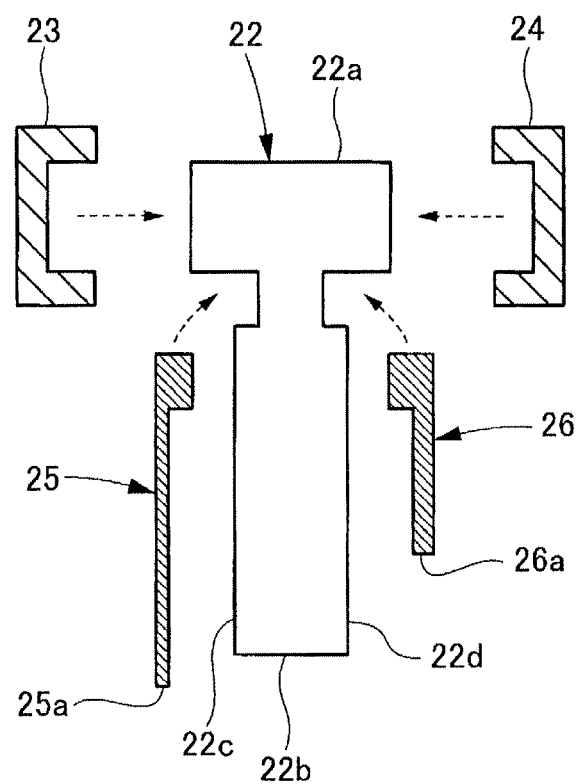
FIG. 3 is an exploded view of a support structure of thin-plate seal pieces.

With reference to FIGS. 2 and 3, each of the thin-plate seal pieces 22 is made from a flexible material having flexibility and is formed into a flat plate shape with its width dimension being in the axial direction of the rotating shaft 13. Specifically, the thin-plate seal piece 22 is formed into a T shape in which the plate width on the proximal end side (the outer-circumferential-side proximal end section 22a) is wider than the plate width on the distal end side (the inner-circumferential-side distal end section 22b) and is thinned so as to exhibit flexibility. The thin-plate seal pieces 22 are arranged into a ring shape while having minute gaps of a certain size therebetween in the circumferential direction of the rotating shaft 13.

The proximal end sides of the thin-plate seal pieces 22 are held between a pair of right and left retainers 23, 24 for maintaining the ring-shaped arrangement of the thin-plate seal pieces 22 so as to be enclosed from both sides in the plate width direction. The retainers 23, 24 are fitted into the ring-shaped groove 21a of the seal housing 21.

A high-pressure-side plate 25 and a low-pressure-side plate 26 are disposed respectively on the high pressure side and the low pressure side of the thin-plate seal pieces 22 and function as guide plates for the fluid G.

Specifically, the high-pressure-side plate 25 having a ring shape is disposed on left side sections (side sections positioned at the left in FIGS. 2 and 3 on paper), facing the high-pressure-side region, of the thin-plate seal pieces 22. This high-pressure-side plate 25 is disposed adjacent to high-pressure-side side edge sections 22c, facing the high-pressure-side region, of the thin-plate seal pieces 22 and is held between the high-pressure-side side edge sections 22c and the retainer 23.

Here, an inner-circumferential-side distal end section 25a of the high-pressure-side plate 25 extends to an opening edge section of the ring-shaped groove 21a but does not reach the inner-circumferential-side distal end sections 22b of the thin-plate seal pieces 22. Moreover, a high-pressure-side gap δH of a certain size is defined between a high-pressure-side side surface 21b, facing the high-pressure-side region, of the ring-shaped groove 21a and the high-pressure-side plate 25 in the axial direction of the rotating shaft 13 (the fluid flowing direction, the plate width direction of the seal pieces).

The high-pressure-side plate 25 provided in this way allows the inner-circumferential-side distal end sections 22b of the thin-plate seal pieces 22 to be positioned inward in the radial direction of the rotating shaft 13 with respect to the inner-circumferential-side distal end section 25a of the high-pressure-side plate 25. Accordingly the fluid G flows in from the high-pressure-side region through the distal end side of the thin-plate seal pieces 22.

On the other hand, the low-pressure-side plate 26 having a ring shape is disposed on right side sections (side sections positioned at the right in FIGS. 2 and 3 on paper), facing the low-pressure-side region, of the thin-plate seal pieces 22. This low-pressure-side plate 26 is disposed adjacent to low-pressure-side side edge sections 22d, facing the low-pressure-side region, of the thin-plate seal pieces 22 and is held between the low-pressure-side side edge sections 22d, and the retainer 24 and a low-pressure-side side surface 21c, facing the low-pressure-side region, of the ring-shaped groove 21a.

Here, an inner-circumferential-side distal end section 26a of the low-pressure-side plate 26 does not reach an opening edge section of the ring-shaped groove 21a and the inner-circumferential-side distal end sections 22b of the thin-plate seal pieces 22 and is positioned outward in the radial direction of the rotating shaft 13 with respect to the inner-circumferential-side distal end section 25a of the high-pressure-side plate 25. In other words, the low-pressure-side plate 26 is shorter than the high-pressure-side plate 25. Moreover, a low-pressure-side gap δL of a certain size is defined between the low-pressure-side side surface 21c of the ring-shaped groove 21a and the low-pressure-side side edge sections 22d in the axial direction of the rotating shaft 13.

The low-pressure-side plate 26 provided in this way allows the low-pressure-side gap δL to be defined between the low-pressure-side side surface 21c and the low-pressure-side side edge sections 22d. The low-pressure-side gap δL is defined by the thickness of the low-pressure-side plate 26, and the size of the low-pressure-side gap δL can thus be set by adjusting the thickness of the low-pressure-side plate 26.

The pressure distribution of the fluid G generated in the top and bottom surfaces of the thin-plate seal pieces 22 can be set in accordance with the sizes of the high-pressure-side gap δH and the low-pressure-side gap δL. In addition, the magnitude of the pressure difference (lifting-up force) due to relative positional shift in the pressure distribution between the top and bottom surfaces of the thin-plate seal pieces 22 can be set in accordance with the quantitative relationship between the size of the high-pressure-side gap δH and the size of the low-pressure-side gap δL.

In the shaft seal mechanism 11 according to the present invention, the radial gap size between the inner-circumferential-side distal end section 26a of the low-pressure-side plate 26 and the outer circumferential surface of the rotating shaft 13 is greater than the radial gap size between the inner-circumferential-side distal end section 25a of the high-pressure-side plate 25 and the outer circumferential surface of the rotating shaft 13, in order to yield stable lifting-up force.

With this configuration, while the rotation of the rotating shaft 13 is stopping, the inner-circumferential-side distal end sections 22b of the thin-plate seal pieces 22 are in contact with the outer circumferential surface of the rotating shaft 13 at the predetermined preload. On the other hand, while the rotating shaft 13 is rotating, lifting-up force is applied to the thin-plate seal pieces 22 by the pressure difference due to relative positional shift in the pressure distribution between the top and bottom surfaces of the thin-plate sheet pieces 22 and by dynamic pressure effect of the fluid G generated by the rotation of the rotating shaft 13. This force bends the thin-plate seal pieces 22, and accordingly, the inner-circumferential-side distal end sections 22b thereof are lifted up from the outer circumferential surface of the rotating shaft 13 into a noncontact state, resulting in prevention of abrasion of and heat generation in the rotating shaft 13 and the thin-plate seal pieces 22. At the same time, the thin-plate seal pieces 22 in a noncontact state with the rotating shaft 13 reduce a leakage of the fluid G flowing from the high-pressure-side region to the low-pressure-side region.

Figure 4:
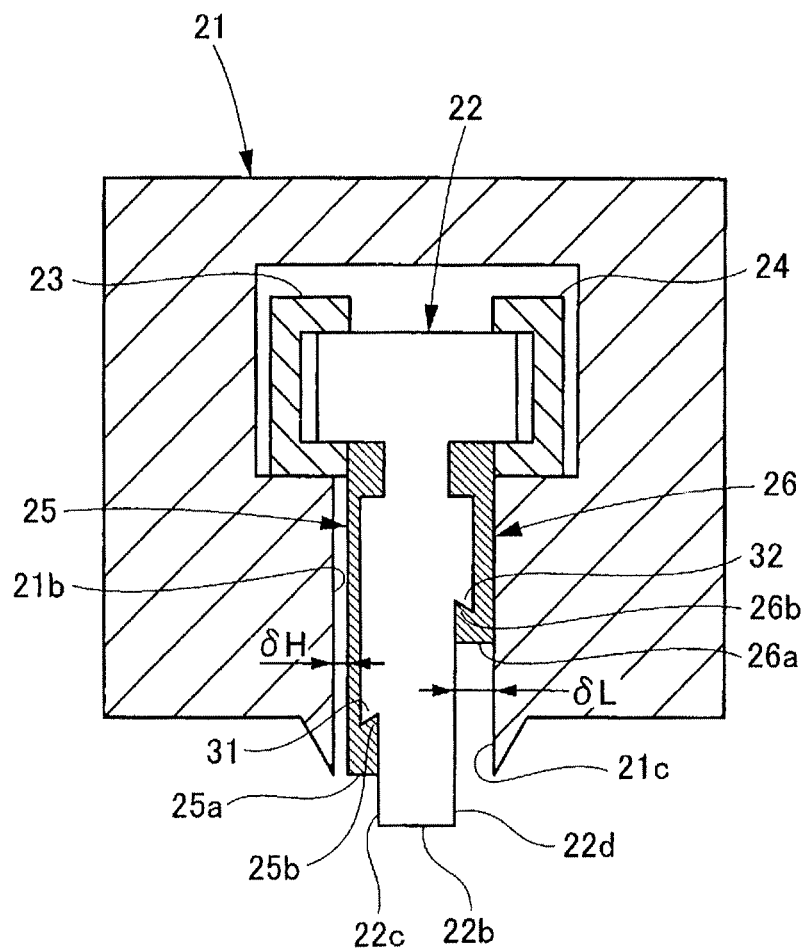
FIG. 4 is a detailed view of a shaft seal mechanism according to Example 1 and is a front view of a thin-plate seal piece.

With reference to FIG. 4, a stepped section (high-pressure-side stepped section) 31 and a stepped section (low-pressure-side stepped section) 32 are respectively formed on the high-pressure-side side edge section 22c and the low-pressure-side side edge section 22d of each of the thin-plate seal pieces 22. These stepped sections 31, 32 are disposed in radial intermediate sections (longitudinal intermediate sections) of the side edge sections 22c, 22d and are shaped into such steps that a section, inward from the stepped section 31 in the radial direction, of the thin-plate seal piece 22 has a uniform plate width and that the thin-plate seal piece 22 is tapered. The steps of the stepped sections 31, 32 are formed by inclined end surfaces. These inclined end surfaces face inward in the radial direction of the rotating shaft 13 and are inclined such that an inclined end section outward in the plate width direction of the seal piece is positioned inward in the radial direction of the rotating shaft 13 with respect to an inclined end section inward in the plate width direction of the seal piece.

In response to this, a locking section (high-pressure-side locking section) 25b is formed on the inner-circumferential-side distal end section 25a of the high-pressure-side plate 25. The locking section 25b is formed so as to protrude from the high-pressure-side plate 25 toward the high-pressure-side side edge section 22c in the plate width direction of the thin-plate seal piece 22, and a ring-shaped inclined surface is formed on the distal end section of the protrusion. This inclined surface faces outward in the radial direction of the rotating shaft 13 and is inclined such that an inclined end section inward in the plate width direction of the seal piece is positioned outward in the radial direction of the rotating shaft 13 with respect to an inclined end section outward in the plate width direction of the seal piece.

In addition, a locking section (low-pressure-side locking section) 26b is formed on the inner-circumferential-side distal end section 26a of the low-pressure-side plate 26. The locking section 26b is formed so as to protrude from the low-pressure-side plate 26 toward the low-pressure-side side edge section 22d in the plate width direction of the thin-plate seal piece 22, and a ring-shaped inclined surface is formed on the distal end section of the protrusion. This inclined surface faces outward in the radial direction of the rotating shaft 13 and is inclined such that an inclined end section inward in the plate width direction of the seal piece is positioned outward in the radial direction of the rotating shaft 13 with respect to an inclined end section outward in the plate width direction of the seal piece.

That is, the inclined end surface of the stepped section 31 and the inclined surface of the locking section 25b can be engaged with each other in the radial direction of the rotating shaft 13, and the inclined end surface of the stepped section 32 and the inclined surface of the locking section 26b can be engaged with each other in the radial direction of the rotating shaft 13. This configuration prevents detachment in the radial direction of the rotating shaft 13, between the inclined surfaces of the locking sections 25b, 26b and the inclined end surfaces of the stepped sections 31, 32 that are engaged with each other.

For example, if the pressure of the fluid G flowing from the high-pressure-side region to the low-pressure-side region in turbine operation presses the thin-plate seal pieces 22 toward the low-pressure-side region, or if a mechanism assembling error occurs after assembly of the shaft seal mechanism 11, the size of the low-pressure-side gap $\delta L$ becomes smaller than the gap size for yielding stable lifting-up force (for example, $\delta H > \delta L$), resulting in disturbance in the pressure distribution and pressure difference generated in the thin-plate seal pieces 22. This disturbance applies pressing force in a direction opposite to the applying direction of the lifting-up force to the thin-plate seal pieces 22. Accordingly, the inner-circumferential-side distal end sections 22b are deformed to be pressed against the rotating shaft 13 by pressure greater than the preload while the rotation of the rotating shaft 13 is stopping.

However, in the shaft seal mechanism 11 according to the present invention, the locking sections 25b, 26b provided in the high-pressure-side plate 25 and the low-pressure-side plate 26 can be engaged with the stepped sections 31, 32 of the thin-plate seal pieces 22 from the inside toward the outside in the radial direction of the rotating shaft 13. This engagement allows the stepped sections 31, 32 to be hooked on the locking sections 25b, 26b even if pressing force greater than the preload is applied to the thin-plate seal pieces 22 and thus suppresses deformation of the thin-plate seal pieces 22 against the rotating shaft 13. This configuration can maintain the inner-circumferential-side distal end sections 22b of the thin-plate seal pieces 22 in a noncontact state without contact with the rotating shaft 13, resulting in prevention of abrasion of the thin-plate seal pieces 22.

The inclined surfaces of the locking sections 25b, 26b and the inclined end surfaces of the stepped sections 31, 32 can be engaged with each other in the radial direction of the rotating shaft 13. Consequently, even if the thin-plate seal pieces 22 are assembled while being inclined toward the high pressure side or the low pressure side, the locking sections 25b, 26b ensure locking of the stepped sections 31, 32.

Furthermore, in the shaft seal mechanism 11 according to the present invention, only the thin-plate seal pieces 22, the high-pressure-side plate 25, and the low-pressure-side plate 26 change in shapes among the components of existing seal mechanisms. A large component, such as the seal housing 21, is not required to change in shape, so that abrasion of the thin-plate seal pieces 22 due to pressing force can be prevented without a significant design change.

Figure 5:
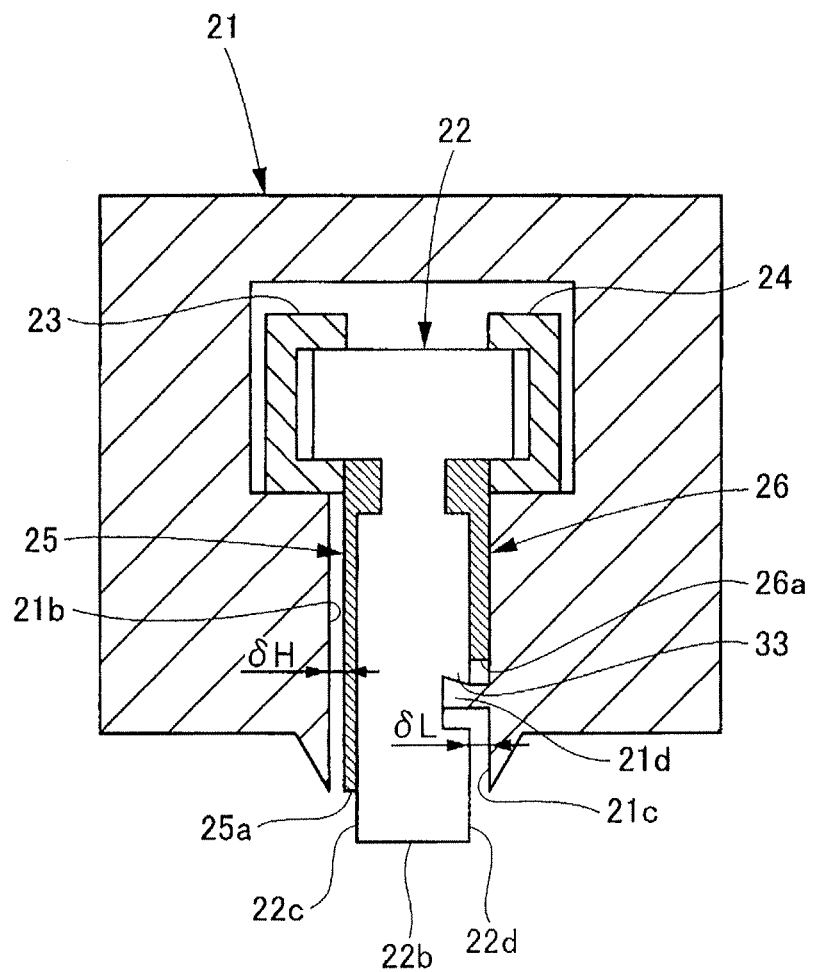
FIG. 5 is a detailed view of a shaft seal mechanism according to Example 2 and is a front view of a thin-plate seal piece.
Figure 6:
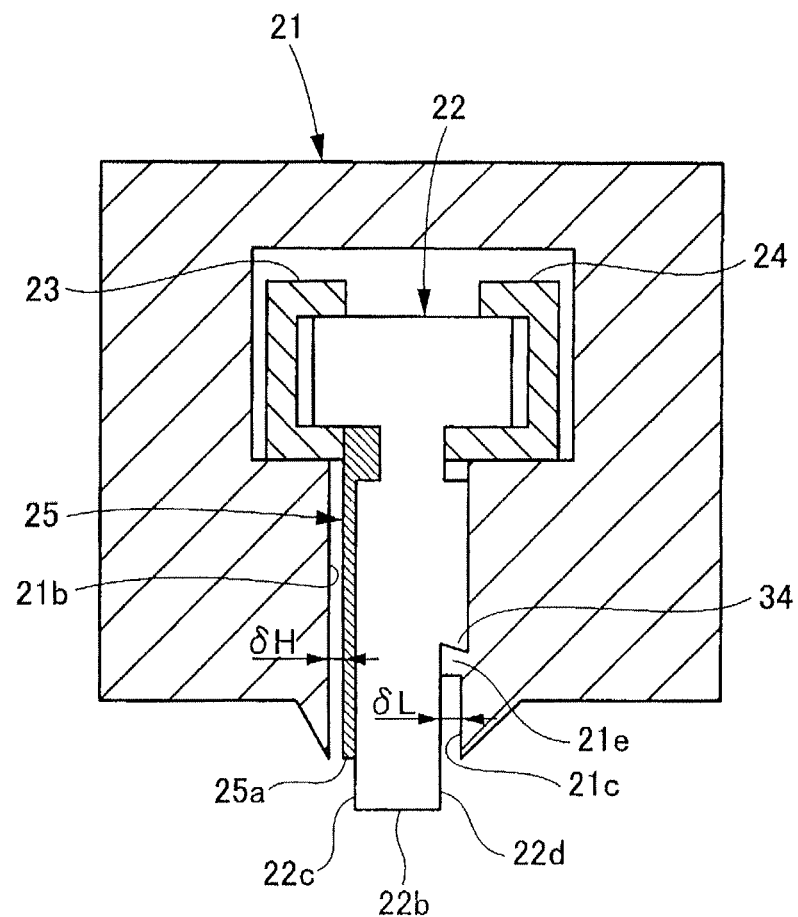
FIG. 6 is a detailed view of a shaft seal mechanism according to Example 3 and is a front view of a thin-plate seal piece.

The thin-plate seal pieces 22 are locked by the high-pressure-side plate 25 and the low-pressure-side plate 26 in the aforementioned embodiment but may be locked by the seal housing 21 as illustrated in FIGS. 5 and 6.

With reference to FIG. 5, a stepped section (low-pressure-side stepped section) 33 is formed on the low-pressure-side side edge section 22d of each of the thin-plate seal pieces 22. This stepped section 33 is disposed inward in the radial direction of the rotating shaft 13 with respect to the inner-circumferential-side distal end section 26a of the low-pressure-side plate 26 and is shaped into a notch formed by cutting out a portion of the low-pressure-side side edge section 22d. A step of the stepped section 33 is formed by an inclined end surface. This inclined end surface faces inward in the radial direction of the rotating shaft 13 and is inclined such that an inclined end section outward in the plate width direction of the seal piece is positioned inward in the radial direction of the rotating shaft 13 with respect to an inclined end section inward in the plate width direction of the seal piece.

In response to this, a locking section (low-pressure-side locking section) 21d is formed on the low-pressure-side side surface 21c of the seal housing 21. The locking section 21d is formed so as to protrude from the low-pressure-side side surface 21c toward the low-pressure-side side edge section 22d in the plate width direction of the thin-plate seal piece 22, and a ring-shaped inclined surface is formed on the distal end section of the protrusion. This inclined surface faces outward in the radial direction of the rotating shaft 13 and is inclined such that an inclined end section inward in the plate width direction of the seal piece is positioned outward in the radial direction of the rotating shaft 13 with respect to an inclined end section outward in the plate width direction of the seal piece.

That is, the locking section 21d is positioned inward in the radial direction of the rotating shaft 13 with respect to the inner-circumferential-side distal end section 26a of the low-pressure-side plate 26, and the inclined surface of the locking section 21d and the inclined end surface of the stepped section 33 can be engaged with each other in the radial direction of the rotating shaft 13. This configuration prevents detachment in the radial direction of the rotating shaft 13, between the inclined surface of the locking section 21*d* and the inclined end surface of the stepped section 33 that are engaged with each other.

The locking section 21*d* provided in the seal housing 21 can be engaged with the stepped sections 33 of the thin-plate seal pieces 22 from the inside toward the outside in the radial direction of the rotating shaft 13. This engagement allows the stepped sections 33 to be hooked on the locking section 21*d* even if pressing force greater than the preload is applied to the thin-plate seal pieces 22 and thus suppresses deformation of the thin-plate seal pieces 22 against the rotating shaft 13. This configuration can maintain the inner-circumferential-side distal end sections 22*b* of the thin-plate seal pieces 22 in a noncontact state without contact with the rotating shaft 13, resulting in prevention of abrasion of the thin-plate seal pieces 22.

Moreover, the locking section 21*d* is provided in the seal housing 21 being a large component and can thus have enhanced rigidity, resulting in maintaining an engagement state between the locking section 21*d* and the stepped sections 33 over a long period.

With reference to FIG. 6, a stepped section (low-pressure-side stepped section) 34 is formed on the low-pressure-side side edge section 22*d* of each of the thin-plate seal pieces 22. This stepped section 34 is disposed in a radial intermediate section (longitudinal intermediate section) of the low-pressure-side side edge section 22*d* and is shaped into such a step that the thin-plate seal piece 22 is tapered by being recessed toward the center of the thin-plate seal piece 22 in the plate width direction. The step of the stepped section 34 is formed by an inclined end surface. This inclined end surface faces inward in the radial direction of the rotating shaft 13 and is inclined such that an inclined end section outward in the plate width direction of the seal piece is positioned inward in the radial direction of the rotating shaft 13 with respect to an inclined end section inward in the plate width direction of the seal piece.

In response to this, a locking section (low-pressure-side locking section) 21*e* is formed on the low-pressure-side side surface 21*c* of the seal housing 21. The locking section 21*e* is formed so as to protrude from the low-pressure-side side surface 21*c* toward the low-pressure-side side edge section 22*d* in the plate width direction of the thin-plate seal piece 22, and a ring-shaped inclined surface is formed on the distal end section of the protrusion. This inclined surface faces outward in the radial direction of the rotating shaft 13 and is inclined such that an inclined end section inward in the plate width direction of the seal piece is positioned outward in the radial direction of the rotating shaft 13 with respect to an inclined end section outward in the plate width direction of the seal piece.

That is, the inclined surface of the locking section 21*e* and the inclined end surface of the stepped section 34 can be engaged with each other in the radial direction of the rotating shaft 13. This configuration prevents detachment in the radial direction of the rotating shaft 13, between the inclined surface of the locking section 21*e* and the inclined end surface of the stepped section 34 that are engaged with each other.

The locking section 21*e* provided in the seal housing 21 can be engaged with the stepped sections 34 of the thin-plate seal pieces 22 from the inside toward the outside in the radial direction of the rotating shaft 13. This engagement allows the stepped sections 34 to be hooked on the locking section 21*e* even if pressing force greater than the preload is applied to the thin-plate seal pieces 22 and thus suppresses deformation of the thin-plate seal pieces 22 against the rotating shaft 13. This configuration can maintain the inner-circumferential-side distal end sections 22*b* of the thin-plate seal pieces 22 in a noncontact state without contact with the rotating shaft 13, resulting in prevention of abrasion of the thin-plate seal pieces 22.

Moreover, the locking section 21*e* is provided in the seal housing 21 being a large component and can thus have enhanced rigidity, resulting in maintaining an engagement state between the locking section 21*e* and the stepped sections 34 over a long period. In addition, the low-pressure-side plate 26 is not required to be provided, so that the shaft seal mechanism 11 can have a simple configuration and that the manufacturing cost of the shaft seal mechanism 11 can be reduced.

INDUSTRIAL APPLICABILITY

The shaft seal mechanism according to the present invention can prevent damage of the thin-plate seal pieces due to pressing force and increase the life of the seal pieces, and can thus be applied significantly advantageously in continuous operation of a turbine.

REFERENCE SIGNS LIST

11 Shaft seal mechanism
12 Fixed section
13 Rotating shaft
14 Ring-shaped space
21 Seal housing
21*a* Ring-shaped groove
21*b* High-pressure-side side surface
21*c* Low-pressure-side side surface
21*d*, 21*e* Locking section
22 Thin-plate seal piece
22*a* Outer-circumferential-side proximal end section
22*b* Inner-circumferential-side proximal end section
22*c* High-pressure-side side edge section
22*d* Low-pressure-side side edge section
23, 24 Retainer
25 High-pressure-side plate
25*a* Inner-circumferential-side distal end section
25*b* Locking section
26 Low-pressure-side plate
26*a* Inner-circumferential-side distal end section
26*b* Locking section
31 to 34 Stepped section
G Fluid
δH High-pressure-side gap
δL Low-pressure-side gap

The invention claimed is:

1. A shaft seal mechanism being disposed in a ring-shaped space defined between a fixed section and a rotating shaft to divide the ring-shaped space into a high-pressure-side region and a low-pressure-side region and to block a fluid flowing from the high-pressure-side region to the low-pressure-side region in a rotating shaft direction within the ring-shaped space, the shaft seal mechanism comprising:
a ring-shaped seal housing being disposed on an inner circumferential section of the fixed section;
multiple thin-plate seal pieces comprising outer-circumferential-side proximal end sections fixed to the seal housing and inner-circumferential-side distal end sections being free ends forming acute angles with an outer circumferential surface of the rotating shaft, the thin-plate seal pieces having width dimensions in the rotating shaft direction, and the thin-plate seal pieces being layered in a ring shape in a circumferential direction of the rotating shaft;

a ring-shaped high-pressure-side plate being disposed adjacent to high-pressure-side side edge sections, facing the high-pressure-side region, of the thin-plate seal pieces so that a high-pressure-side gap is defined between the high-pressure-side plate and the seal housing in the rotating shaft direction;

a ring-shaped low-pressure-side plate being held between low-pressure-side side edge sections, facing the low-pressure-side region, of the thin-plate seal pieces and the seal housing so that a low-pressure-side gap is defined between the low-pressure-side side edge sections and the seal housing in the rotating shaft direction;

high-pressure-side stepped sections which are formed on the high-pressure-side side edge sections and which have inclined end surfaces facing inward in a radial direction of the rotating shaft and inclined such that end sections outward in a plate width direction of the thin-plate seal pieces are position inward in the radial direction of the rotating shaft with respect to end sections inward in the plate width direction of the thin-plate seal pieces;

low-pressure-side stepped sections which are formed on the low-pressure-side side edge sections and which have inclined end surfaces facing inward in the radial direction of the rotating shaft and inclined such that end sections outward in the plate width direction of the thin-plate seal pieces are positioned inward in the radial direction of the rotating shaft with respect to end sections inward in the plate width direction of the thin-plate seal pieces;

a high-pressure-side locking section which is formed on the high-pressure-side plate, which has, on a distal end section, an inclined surface facing outward in the radial direction of the rotating shaft and inclined such that an end section inward in the plate width direction of the thin-plate seal pieces is positioned outward in the radial direction of the rotating shaft with respect to an end section outward in the plate width direction of the thin-plate seal pieces, and which locks the high-pressure-side stepped sections from an inside in the radial direction of the rotating shaft; and a low-pressure-side locking section which is formed on the low-pressure-side plate, which has, on a distal end section, an inclined surface facing outward in the radial direction of the rotating shaft and inclined such that an end section inward in the plate width direction of the thin-plate seal pieces is positioned outward in the radial direction of the rotating shaft with respect to an end section outward in the plate width direction of the thin-plate seal pieces, and which locks the low-pressure-side stepped sections from the inside in the radial direction of the rotating shaft, wherein the high-pressure-side stepped sections each comprise the inclined end surface engaged with the inclined surface of the high-pressure-side locking section in the radial direction of the rotating shaft, and wherein the low-pressure-side stepped sections each comprise the inclined end surface engaged with the inclined surface of the low-pressure-side locking section in the radial direction of the rotating shaft.

2. A shaft seal mechanism being disposed in a ring-shaped space defined between a fixed section and a rotating shaft to divide the ring-shaped space into a high-pressure-side region and a low-pressure-side region and to block a fluid flowing from the high-pressure-side region to the low-pressure-side region in a rotating shaft direction within the ring-shaped space, the shaft seal mechanism comprising:

a ring-shaped seal housing being disposed on an inner circumferential section of the fixed section;

multiple thin-plate seal pieces comprising outer-circumferential-side proximal end sections fixed to the seal housing and inner-circumferential-side distal end sections being free ends forming acute angles with an outer circumferential surface of the rotating shaft, the thin-plate seal pieces having width dimensions in the rotating shaft direction, and the thin-plate seal pieces being layered in a ring shape in a circumferential direction of the rotating shaft so that a low-pressure-side gap is defined between low-pressure-side side edge sections facing the low-pressure-side region and the seal housing in the rotating shaft direction;

low-pressure-side stepped sections which are formed on the low-pressure-side side edge sections and which have inclined end surfaces facing inward in the radial direction of the rotating shaft and inclined such that end sections outward in the plate width direction of the thin-plate seal pieces are positioned inward in the radial direction of the rotating shaft with respect to end sections inward in the plate width direction of the thin-plate seal pieces; and a low-pressure-side locking section which is formed on the seal housing, which has, on a distal end section, an inclined surface facing outward in the radial direction of the rotating shaft and inclined such that an end section inward in the plate width direction of the thin-plate seal pieces is positioned outward in the radial direction of the rotating shaft with respect to an end section outward in the plate width direction of the thin-plate seal pieces, and which locks the low-pressure-side stepped sections from the inside in a radial direction of the rotating shaft.

3. The shaft seal mechanism according to claim 2, wherein the shaft seal mechanism further comprises a ring-shaped low-pressure-side plate being held between the low-pressure-side side edge sections and the seal housing so that the low-pressure-side gap is defined between the low-pressure-side side edge sections and the seal housing; and the low-pressure-side locking section locks the low-pressure-side stepped sections inward in the radial direction of the rotating shaft with respect to an inner-circumferential-side distal end section of the low-pressure-side plate.

4. The shaft seal mechanism according to claim 2, wherein the low-pressure-side stepped sections each comprise an inclined end surface engaged with an inclined surface of the low-pressure-side locking section in the radial direction of the rotating shaft.

* * * * *